(12) United States Patent
D'Alessandro et al.

(10) Patent No.: US 8,517,444 B2
(45) Date of Patent: Aug. 27, 2013

(54) RECONFIGURABLE CONSOLE ASSEMBLY AND METHOD OF ASSEMBLING THE SAME

(75) Inventors: Anthony D'Alessandro, Ray Township, MI (US); Cedric Caravano, Bloomfield Hills, MI (US); Daniel Vander Sluis, Rochester Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/355,107

(22) Filed: Jan. 20, 2012

(65) Prior Publication Data

US 2013/0187400 A1     Jul. 25, 2013

(51) Int. Cl.
*B60R 7/04* (2006.01)
(52) U.S. Cl.
USPC ...................... 296/24.43; 296/37.8
(58) Field of Classification Search
USPC ..................... 296/24.34, 37.8, 24.4
IPC ......................................... B60R 7/04
See application file for complete search history.

(56) References Cited

U.S. PATENT DOCUMENTS

| 5,358,307 A | 10/1994 | Shafer et al. |
| 5,839,710 A * | 11/1998 | Hubbard .................... 248/311.2 |
| 2010/0155441 A1 | 6/2010 | Gaudig et al. |
| 2011/0074173 A1 | 3/2011 | Gaudig et al. |

FOREIGN PATENT DOCUMENTS

DE      102009049364 A1    4/2011

* cited by examiner

*Primary Examiner* — Dennis Pedder
*Assistant Examiner* — Beverly Becker
(74) *Attorney, Agent, or Firm* — Ingrassia Fisher & Lorenz, PC

(57) ABSTRACT

A reconfigurable console assembly includes, but is not limited to, a stationary wall adapted for attachment to a vehicle. The assembly further includes a reconfigurable wall having a stationary end, a movable end, and a substantially constant length. The stationary end is attached to the stationary wall and the movable end moves between a stowed position and a deployed position. The reconfigurable wall flexes along a longitudinal axis as the movable end moves between the stowed and deployed positions. The stationary wall and the reconfigurable wall define a storage bin when the movable end is in the deployed position. The assembly further includes a constraining element connected to the movable end. The constraining element constrains the movable end to remain in the stowed position when the movable end is in the stowed position and to remain in the deployed position when the movable end is in the deployed position.

13 Claims, 11 Drawing Sheets

RECONFIGURABLE CONSOLE ASSEMBLY AND METHOD OF ASSEMBLING THE SAME

TECHNICAL FIELD

The technical field generally relates to vehicles, and more particularly relates to a reconfigurable console assembly for a vehicle and a method of assembling a reconfigurable console assembly.

BACKGROUND

Console assemblies in vehicles, including, but not limited to, center console assemblies that are situated between a driver seat and a front passenger seat, are conventionally assembled from injection molded plastic parts. The injection molded plastic parts are assembled together to form a substantially rigid outer structure having one or more hollow compartments that are configured to receive cargo and/or other items. Such center console assemblies have substantially rigid external peripheries that cannot be reconfigured.

Depending upon its size, a relatively large amount of floor space in the vehicle may be consumed by a conventional console assembly. For example, in the case of a center console assembly mounted to a passenger sedan, the floor space between the two front seats may be completely consumed and/or obstructed by the center console assembly. Such a configuration is common in modern vehicles and limits the amount of floor space and volume (i.e., the airspace above the floor space that is occupied by the center console assembly) that would otherwise be available for an occupant to place his or her feet and/or legs in and thus can have a negative impact on occupant comfort. This may be particularly inconvenient in small vehicles that have correspondingly small interiors.

Significantly, the floor space consumed by conventional console assemblies will be consumed regardless of whether the console assembly is loaded with cargo. Thus, in instances where the console assembly is empty, the floor space that would otherwise be usable to a vehicle occupant is sacrificed without benefit.

Past attempts to address this problem have been adequate, but leave room for improvement. For example, U.S. Pat. No. 5,358,307, issued to Shafer et al. discloses a console that is mounted to a front seat in a vehicle and which moves forward and backwards together with the front seat. In some embodiments, the console includes an adjustable strap that can extend from the console to secure items to the console. While, the seat mounted console of Shafer may provide added floor space for one of the front occupants when one of front seats is moved backwards, this can be quite inconvenient for passengers seated behind that seat and may also be undesirable to the occupant of the repositioned front seat. The adjustable strap will likewise move with the seat and can drag whatever cargo (e.g., briefcase, purse, etc.) along the floor of the vehicle as the seat moves, which may also be inconvenient or undesirable. Furthermore, the strap is only effective to secure items above a certain height.

Accordingly, it is desirable to have a reconfigurable console assembly in a vehicle that provides an occupant with the flexibility to selectively choose between available storage capacity on the one hand, and an expanded area of usable floor space on the other hand. In addition, it is desirable to provide a method for assembling a reconfigurable console assembly. Furthermore, other desirable features and characteristics will become apparent from the subsequent detailed description and the appended claims, taken in conjunction with the accompanying drawings and the foregoing technical field and background.

SUMMARY

Various embodiments of a reconfigurable console assembly for a vehicle and a method of assembling a reconfigurable console for a vehicle are disclosed herein.

In a first non-limiting embodiment, the reconfigurable console assembly includes, but is not limited to, a stationary wall that is adapted for attachment to the vehicle. The reconfigurable console assembly further includes a reconfigurable wall that has a stationary end and a movable end. The stationary end is attached to the stationary wall. The movable end is configured to move between a stowed position and a deployed position. The reconfigurable wall is configured to flex along a longitudinal axis as the movable end moves between the stowed position and the deployed position. The stationary wall and the reconfigurable wall define a storage bin when the movable end is in the deployed position. The reconfigurable console assembly still further includes a constraining element that is connected to the movable end. The constraining element is configured to constrain the movable end to remain in the stowed position when the movable end is in the stowed position and to constrain the movable end to remain in the deployed position when the movable end is in the deployed position.

In another non-limiting embodiment, the method includes, but is not limited to the step of providing a constraining element, a stationary wall, and a reconfigurable wall having a stationary end and a movable end. The reconfigurable wall is configured to flex along a longitudinal axis. The method further includes the step of assembling the stationary end of the reconfigurable wall to the stationary wall such that the movable end of the reconfigurable wall is enabled to move between a stowed position proximate the stationary wall and a deployed position spaced apart from the stationary wall. The method still further includes the step of assembling the constraining element to the movable end of the reconfigurable wall such that the constraining element constrains the movable end to remain in the stowed position when the movable end is in the stowed position and constrains the movable end to remain in the deployed position when the movable end is in the deployed position.

DESCRIPTION OF THE DRAWINGS

One or more embodiments will hereinafter be described in conjunction with the following drawing figures, wherein like numerals denote like elements.

DETAILED DESCRIPTION

Figure 1:
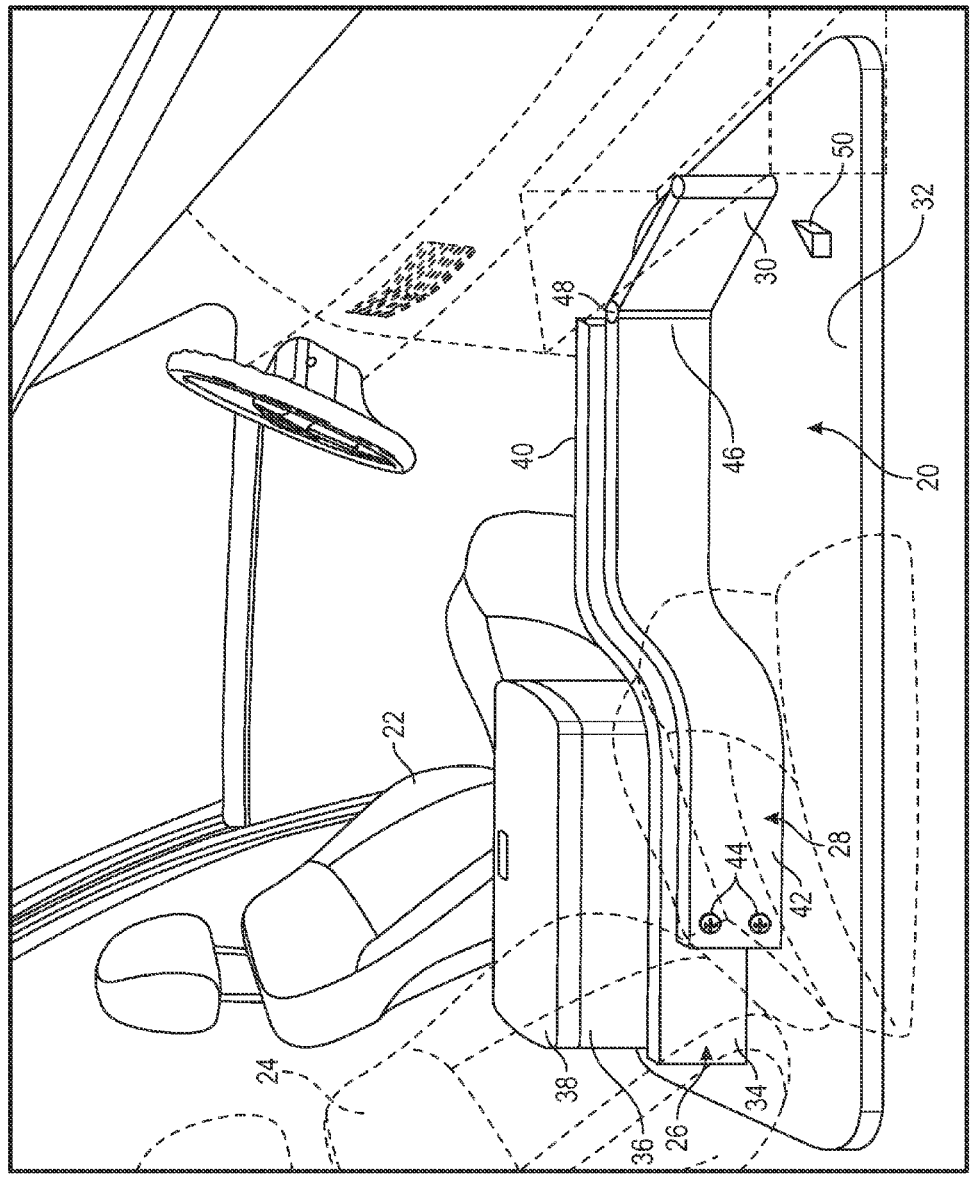
FIG. 1 is a perspective view illustrating an interior of a vehicle equipped with a non-limiting embodiment of a reconfigurable console assembly in accordance with the teachings of the present disclosure while a reconfigurable wall is positioned in a stowed position.

The following detailed description is merely exemplary in nature and is not intended to limit application and uses. Furthermore, there is no intention to be bound by any expressed or implied theory presented in the preceding technical field, background, brief summary or the following detailed description.

A reconfigurable console assembly and method of assembly are disclosed herein. The reconfigurable console assembly includes a stationary wall that is adapted to be attached to a surface of the vehicle, such as to a floor of the vehicle or a covering that is positioned over a center tunnel of the vehicle. Once attached to the floor or other surface of the vehicle, the stationary wall is configured to remain stationary with respect to the vehicle.

The reconfigurable console assembly further includes a reconfigurable wall that is capable of flexing along its longitudinal axis. Unlike an adjustable strap, the reconfigurable wall has a substantially constant length. The reconfigurable wall is mounted to the stationary wall. The reconfigurable wall includes a stationary end and a movable end. The stationary end is fixed to the stationary wall and accordingly remains substantially stationary with respect to the stationary wall. The movable end is located opposite the stationary end and is not attached to any stationary structure including the stationary wall. Nor is the movable end attached to any other stationary structure. Because the stationary end is anchored to the stationary wall and because the reconfigurable wall is configured to flex along its longitudinal axis and because the movable end is not fixed to any stationary object, the movable end is able to move with respect to the stationary wall.

The reconfigurable console assembly further includes a constraining element. The constraining element is connected to the movable end and is configured to control the movement of the moveable end such that the movable end is constrained to move only between a stowed position and a deployed position. The constraining element is further configured to constrain the movable end in the stowed position when the movable end is in the stowed position and to constrain the movable end in the deployed position when the movable end is in the deployed position.

When the movable end is in the stowed position, the reconfigurable wall and the stationary wall have a combined profile that consumes relatively little floor space in the vehicle. As such, the amount of available floor space is increased for an occupant of the vehicle. In one example, when the reconfigurable console assembly is positioned between the driver seat and the front passenger seat and when the reconfigurable wall is in the stowed position, the floor space of the front passenger seat's foot well can extend laterally into the area between the front passenger seat and the driver seat, providing a more commodious compartment for the front passenger.

When the movable end is in the deployed position, the stationary wall and the reconfigurable wall cooperate to form the lateral boundaries of a bin. The driver or the front passenger may use the bin to stow items, including relatively large items such as a hand bag, a purse, a lap top case, and the like. In the absence of the reconfigurable console assembly, such items might otherwise be placed on the floor or other horizontal surface of the vehicle and would move about the passenger compartment in response to the typical forces that arise during normal vehicle operations such as, but not limited to, turning and braking.

Accordingly, the present disclosure provides the advantage of teaching a reconfigurable console assembly that provides an occupant with the flexibility to selectively choose between available storage capacity on the one hand, and an expanded area of usable floor space on the other hand.

An additional advantage of the reconfigurable console assembly disclosed herein is that, in some embodiments, the movable end is disposed proximate the stationary wall when the movable end is in the stowed position and is spaced apart from the stationary wall when the movable end is in the deployed position. By positioning the movable end proximate the stationary wall when the reconfigurable wall is in the stowed position, the footprint consumed by the stationary wall together with the reconfigurable wall will be reduced. Consequently, the amount of available floor space accessible to an occupant of the vehicle sitting adjacent the reconfigurable console assembly will be increased.

Another advantage of the reconfigurable console assembly disclosed herein is that, in some embodiments, the reconfigurable wall is substantially form fitting to the stationary wall when the movable end is in the stowed position. By configuring the reconfigurable wall to be formfitting to the stationary wall when the reconfigurable wall is in the stowed position, the footprint consumed by the stationary wall together with the reconfigurable wall will be minimized Consequently, the amount of available floor space accessible to an occupant of the vehicle sitting adjacent the reconfigurable console assembly will be maximized.

Another advantage of the reconfigurable console assembly disclosed herein is that, in some embodiments, the stationary wall has an arcuate curvature. By providing a stationary wall having an arcuate curvature, a gently curved wall will be positioned next to a vehicle occupant. This may enhance occupant comfort as compared with the experience of sitting next to a wall having an abrupt or sharp corner.

An additional advantage of the reconfigurable console assembly disclosed herein is that, in some embodiments, the stationary wall has a generally "S-shaped" configuration. A generally "S-shaped" configuration may provide greater strength and structural rigidity along a longitudinal axis of the stationary wall than a wall that has a more conventional step configuration.

Another advantage of the reconfigurable console assembly disclosed herein is that, in some embodiments, the reconfigurable wall may comprise a blade spring. Such a configuration may facilitate the transition of the reconfigurable wall between the stowed and the deployed positions.

Another advantage of the reconfigurable console assembly disclosed herein is that, in some embodiments, the reconfigurable console assembly may further include a base that is connected to the stationary wall. The base is configured to support the stationary wall on an interior surface of the vehicle. By providing a base to mount the stationary wall, the installation of the reconfigurable console assembly into a wide variety of vehicles and platforms is greatly facilitated and avoids the need to modify the design of the respective vehicles to which the reconfigurable console assembly is attached.

Another advantage of an embodiment that includes a base is that the constraining element can be mounted to the base. Such a configuration would further facilitate the installation of the reconfigurable console assembly into a vehicle.

An additional advantage of the reconfigurable console assembly disclosed herein is that, in some embodiments, the constraining element comprises a toggle panel having a proximal end and a distal end. The proximal end is connected to the movable end of the reconfigurable wall and the distal end is configured to pivot such that the toggle panel is enabled to pivot between a retracted position and an extended position as the movable end of the reconfigurable wall moves between the stowed position and the deployed position. The use of the toggle panel to control the movement of the movable end of the reconfigurable wall is a relatively simple and inexpensive solution for defining the boundaries of movement of the movable end of the reconfigurable wall. Additionally, the use of the toggle panel is highly adaptable to the varied environments found in the different vehicles to which the reconfigurable console assembly will be assembled.

An additional advantage of the embodiment that utilizes a toggle panel as the constraining element is that, in some embodiments, the proximal end of the toggle panel is connected to the movable end of the reconfigurable wall via a hinge. The use of the hinge to connect the toggle panel with the movable end of the reconfigurable wall provides a robust pivotal connection that will ensure longevity of the connection between the toggle panel and the reconfigurable wall and further provides the advantage of being relatively inexpensive.

An additional advantage of the reconfigurable console assembly disclosed herein is that, in some embodiments, the constraining element includes a track portion, wherein the movable end of the reconfigurable wall is configured to slide in the track portion between a retracted position and an extended position. Such a configuration may provide a relatively high level of control over the movement of the movable end from the stowed position to the deployed position. Such an embodiment may also provide an aesthetically pleasing appearance. Additionally, the track portion may also provide adaptability to the various environments that the reconfigurable console assembly may be packaged in.

An additional advantage of the embodiment where the constraining element includes a track portion is that the constraining element may include both upper and lower tracks segment that are configured to provide support to an upper end and a lower end of the movable end of the reconfigurable wall as the movable end moves between the stowed position and the deployed position.

A greater understanding of the reconfigurable console assembly and method for assembling the same described above may be obtained through an examination of the illustrations accompanying this application together with a review of the detailed description that follows.

FIG. 1 is a perspective view illustrating an interior of a vehicle equipped with a non-limiting embodiment of a reconfigurable console assembly 20 made in accordance with the teachings of the present disclosure.

Although FIG. 1 depicts the driver seat and front passenger seat of a passenger sedan, it should be understood that the teachings of the present disclosure are compatible with any type of automobile including, but not limited to coupes, minivans, full-size vans, sport cars, station wagons, sport utility vehicles, crossover vehicles, pickup trucks, buses, and the like. Furthermore, although reconfigurable console assembly 20 has been depicted as being situated between a driver seat and a front passenger seat of the vehicle, it should be understood that reconfigurable console assembly 20 may be positioned elsewhere in a vehicle without departing from the teachings of the present disclosure. For example, and without limitation, reconfigurable console assembly 20 may be positioned between the second row captain's chairs of a minivan. It should further be understood that although the context of the discussion contained herein is with respect to a reconfigurable console assembly that is positioned between two seats in a vehicle, the reconfigurable console assembly disclosed herein is not limited to such use but rather may be utilized at any suitable location on or within a vehicle. For example, in some embodiments, reconfigurable console assembly 20 may be utilized in the rear cargo area of a sport utility vehicle or station wagon or in the cargo bed of the pickup truck.

In FIG. 1, reconfigurable console assembly 20 is situated between a driver seat 22 and a passenger seat 24 (passenger seat 24 is illustrated in phantom lines to facilitate viewing of reconfigurable console assembly 20). In the embodiment illustrated in FIG. 1, reconfigurable console assembly 20 includes a stationary wall 26, a reconfigurable wall 28, a toggle panel 30, and a base 32. In other embodiments, reconfigurable console assembly 20 may include a greater or lesser number of components.

Stationary wall 26 is securely attached to base 32 in a manner that inhibits stationary wall 26 and/or any portion of stationary wall 26 from moving with respect to base 32. As illustrated in FIG. 1, stationary wall 26 has a curvature along its longitudinal axis. As used herein, the term "longitudinal axis" when referencing stationary wall 26 refers to the axis that runs from a rear portion 34 (with respect to the direction of vehicle travel) of stationary wall 26 to a front portion 40 (with respect to the direction of vehicle travel) of stationary wall 26. In the illustrated embodiment, the curvature along the longitudinal axis of stationary wall 26 is an "S-shaped" curve. In other embodiments, stationary wall 26 may have any other suitable curvature along its longitudinal axis while in still other embodiments, stationary wall 26 may be substantially straight along its longitudinal axis. As a result of the "S-shaped" curve of stationary wall 26, rear portion 34 of stationary wall 26 is spaced apart from driver seat 22. Front portion 40 of stationary wall 26 is disposed proximate driver seat 22. In the illustrated embodiment, front portion 40 is located a distance from driver seat 22 that is approximately equivalent to the distance between a driver seat and a conventional console assembly in a typical modern vehicle available in the marketplace.

A rear portion 42 (with respect to the direction of vehicle travel) of reconfigurable wall 28 is attached to stationary wall 26. In the embodiment illustrated in FIG. 1, this attachment is accomplished via the use of threaded fasteners 44. In other embodiments, this attachment may be accomplished in any suitable manner including via the use of glue, epoxy, welds, mounting brackets, interlocking configurations, and the like. In still other embodiments, a portion of stationary wall 26 may be cut back or may otherwise include a cavity or channel to receive rear portion 42 such that a passenger-side surface of a rear portion 42 is substantially flush with a passenger-side surface of rear portion 34, thus reducing the footprint of, and potentially enhancing the appearance of, reconfigurable console assembly 20. A front portion 46 (with respect to the direction of vehicle travel) of reconfigurable wall 28 is not attached to stationary wall 26. Nor is front portion 46 directly attached to base 32. Accordingly, front portion 46 is able to move with respect to front portion 40.

In the illustrated embodiment, reconfigurable wall 28 is configured to flex along its longitudinal axis. As used herein, the term "longitudinal axis" when referencing reconfigurable wall 28 refers to the axis that runs from rear portion 42 to front portion 46 of reconfigurable wall 28. In some embodiments, reconfigurable wall 28 may comprise a blade spring or may be configured as a metal substrate having a polymeric over-mold encasing the metal substrate. Such a structure has substantial flexibility along its longitudinal axis while providing substantial rigidity and resilience along its lateral axis. These properties enable reconfigurable wall 28 to have the flexibility necessary to permit front portion 46 to move and to be repositioned with respect to front portion 40 of stationary wall 26 while the same time having the rigidity and the structural integrity necessary to support cargo and to serve as an outer wall of a storage bin. In some embodiments, reconfigurable wall 28 may be comprised of a single material including, but not limited to, rubber or plastic. In still other embodiments, any suitable material providing reconfigurable wall 28 with flexibility along its longitudinal axis while also providing relative rigidity and structural integrity along the lateral axis of reconfigurable wall 28 may also be utilized in the construction of reconfigurable wall 28. As used herein, the term "lateral axis" when referencing reconfigurable wall 28 refers to an axis that is substantially perpendicular to the longitudinal axis of reconfigurable wall 28 and that extends within the plane formed by reconfigurable wall 28.

In the illustrated embodiment, toggle panel 30 is pivotally mounted to base 32 and is attached via a hinge 48 to front portion 46. Accordingly, toggle panel 30 serves as a constraining element that controls the movement of front portion 46. The hinged connection between front portion 46 and toggle panel 30 causes front portion 46 and toggle panel 30 to be dynamically linked such that these two components move together. Thus, as front portion 46 moves away from front portion 40 and then back towards front portion 40, toggle panel 30 pivots between a retracted position and an extended position. Additionally, toggle panel 30 causes front portion 46 to move through a constrained arc as front portion 46 moves away from front portion 40.

As illustrated in FIG. 1, front portion 46 is positioned adjacent front portion 40. This position will be referred to herein as the "stowed position." As illustrated, when front portion 46 is in the stowed position, reconfigurable wall 28 is substantially form fitted to stationary wall 26. This form-fitting arrangement is the result of the flexibility of reconfigurable wall 28 along its longitudinal axis. The flexibility of reconfigurable wall 28 along its longitudinal axis also allows reconfigurable wall 28 to behave like spring. Accordingly, when reconfigurable wall 28 is aligned with and form fitted to stationary wall 26, reconfigurable wall 28 is in a compressed state and front portion 46 is urged towards a front direction of the vehicle. However, due to the limitations placed on the movement of front portion 46 by toggle panel 30, front portion 46 cannot move forward. The resultant force caused by toggle panel 30 obstructing forward movement of front portion 46 is towards front portion 40. Front portion 40, being stationary, obstructs movement of front portion 46 towards driver seat 22. Accordingly, in the absence of an external force, front portion 46 is urged towards, and remains adjacent to, front portion 40.

In the illustrated embodiment, a blocking member 50 is attached to base 32. Blocking member 50 protrudes upwardly from an upper surface of base 32 and is positioned to intercept toggle panel 30 as toggle panel pivots to the extended position. Accordingly, blocking member 50 obstructs pivotal movement of toggle panel 30 beyond the extended position. In some embodiment, blocking member 50 may not be needed. For example, in some embodiments, a front portion of reconfigurable console assembly 20 may be configured to be received within an open bin portion of an instrument panel. Such an open bin portion may include walls that can delimit the range of movement of toggle panel 30, making blocking member 50 unnecessary. In other embodiments, base 32 may includes a shallow wall around its periphery that may serve to delimit the pivotal movement of toggle panel 30. In still other embodiments, the pivotal mount that attaches toggle panel 30 to base 32 may include an angle limiter that confines toggle panel 30 to pivot only through a defined range.

Figure 2:
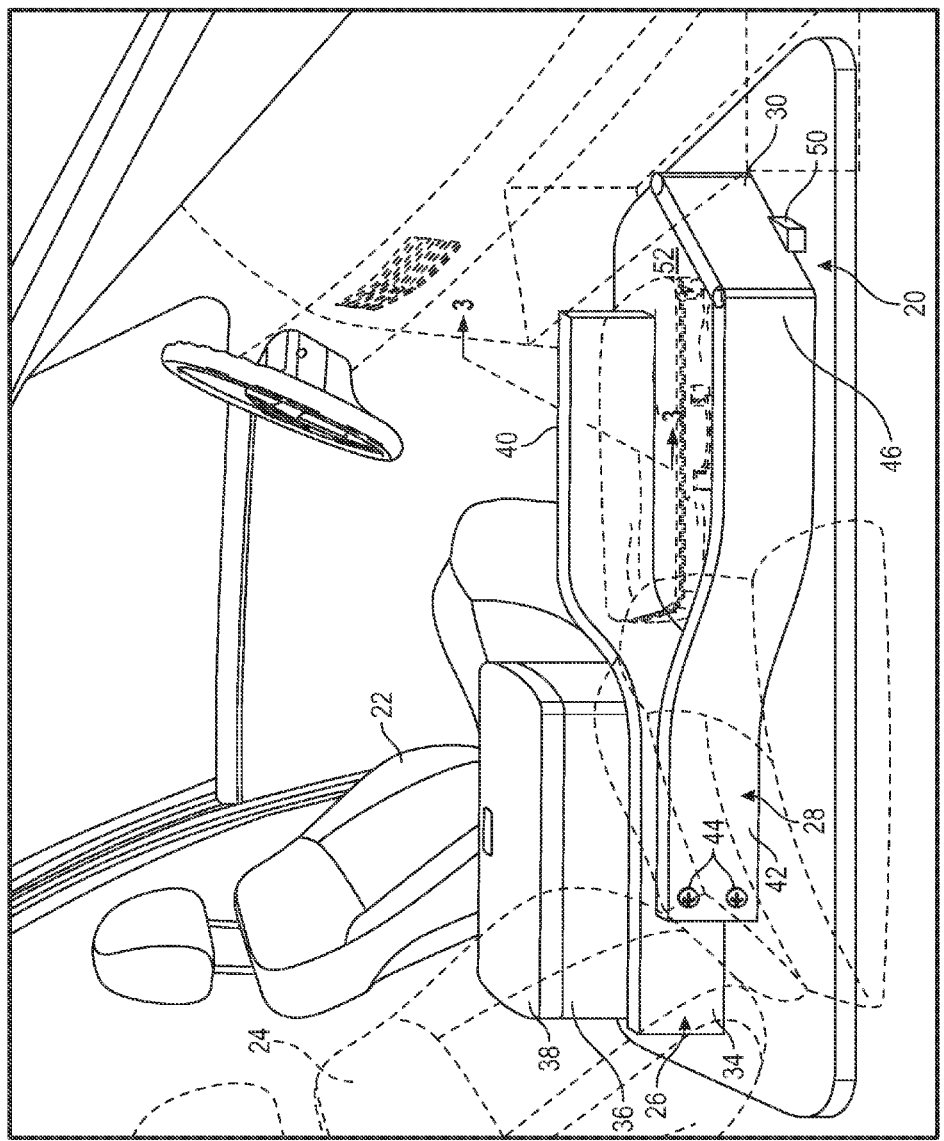
FIG. 2 is a perspective view illustrating the reconfigurable console assembly of FIG. 1 while the reconfigurable wall is positioned in the deployed position.

FIG. 2 is a perspective view illustrating reconfigurable console assembly 20 after front portion 46 of reconfigurable wall 28 has been moved to a position that is spaced apart from front portion 40. This position will be referred to herein as "the deployed position". To move movable end 46 of reconfigurable wall 28 from the stowed position to the deployed position, an occupant of the vehicle need only push front portion 46 towards the deployed position or push toggle panel 30 towards the extended position with enough force to overcome the bias that restrains front portion 46 in the stowed position. This action will be described in detail below.

With front portion 46 in the deployed position, reconfigurable wall 28 takes on a curvature that is substantially a mirror image of the curvature that reconfigurable wall 28 had when front portion 46 was in the stowed position (see FIG. 1). As a result, a front portion of reconfigurable wall 28 and a front portion of stationary wall 26 cooperate to form the boundaries of a bin 52 that is capable of receiving cargo and other items. For example, as illustrated in FIG. 2, a handbag, illustrated in phantom lines, is disposed within bin 52. Bin 52 may be suitable for a number of different cargo items including, but not limited to laptop computers, tablets, groceries, sundry items, and the like. In the illustrated embodiment, a front portion of reconfigurable console assembly 20 is received within a bin structure of instrument panel (shown in phantom lines) and, consequently, a front portion of bin 52 would be bounded by the internal bin of the instrument panel. In other embodiments, it may be desirable to provide stationary wall 26 with the curvature that is conducive to constraining the forward motion of cargo items stored in bin 52.

Movement of front portion 46 of reconfigurable wall 28 has caused toggle panel 30 to move to the extended position. While in the extended position, toggle panel 30 is urged into a position adjacent blocking member 50 by reconfigurable wall 28. As discussed above with respect to FIG. 1, reconfigurable wall 28 may act as a blade spring and while in the deployed position, is in a compressed state. As a result of this compressed state, front portion 46 is urged towards the front of the vehicle and such movement is obstructed by toggle panel 30 and blocking member 50.

Figure 3:
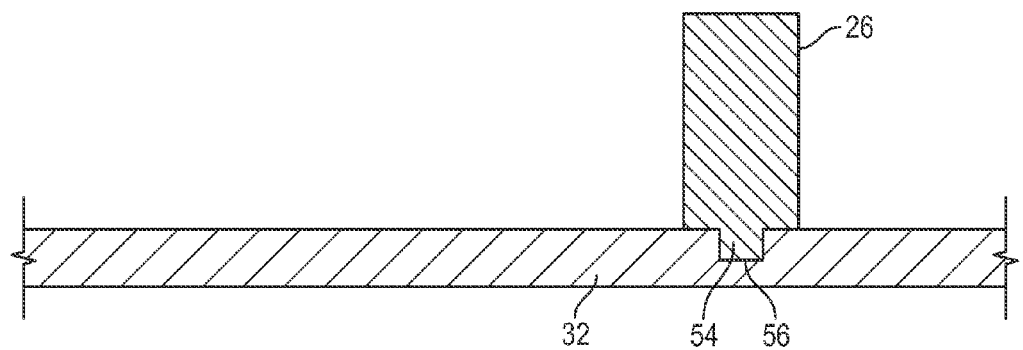
FIG. 3 is a fragmentary cross-sectional view taken along the line of 3-3 in FIG. 2.

FIG. 3 is a fragmentary cross-sectional view taken along the line of 3-3 in FIG. 2. In this view, an exemplary attachment of stationary wall 26 to base 32 is illustrated. In the illustrated embodiment, a bottom portion of stationary wall 26 has a protruding tab 54 which rests within a corresponding slot 56 of base 32. In some embodiments, a tongue-in-groove approach may be utilized. In other embodiments, any suitable mechanism for fastening stationary wall 26 to base 32 in a manner that inhibits movement of stationary wall 26 with respect to base 32 may be utilized. In still other embodiments, stationary wall 26 and base 32 may be integrally formed as a single component.

Figure 4:
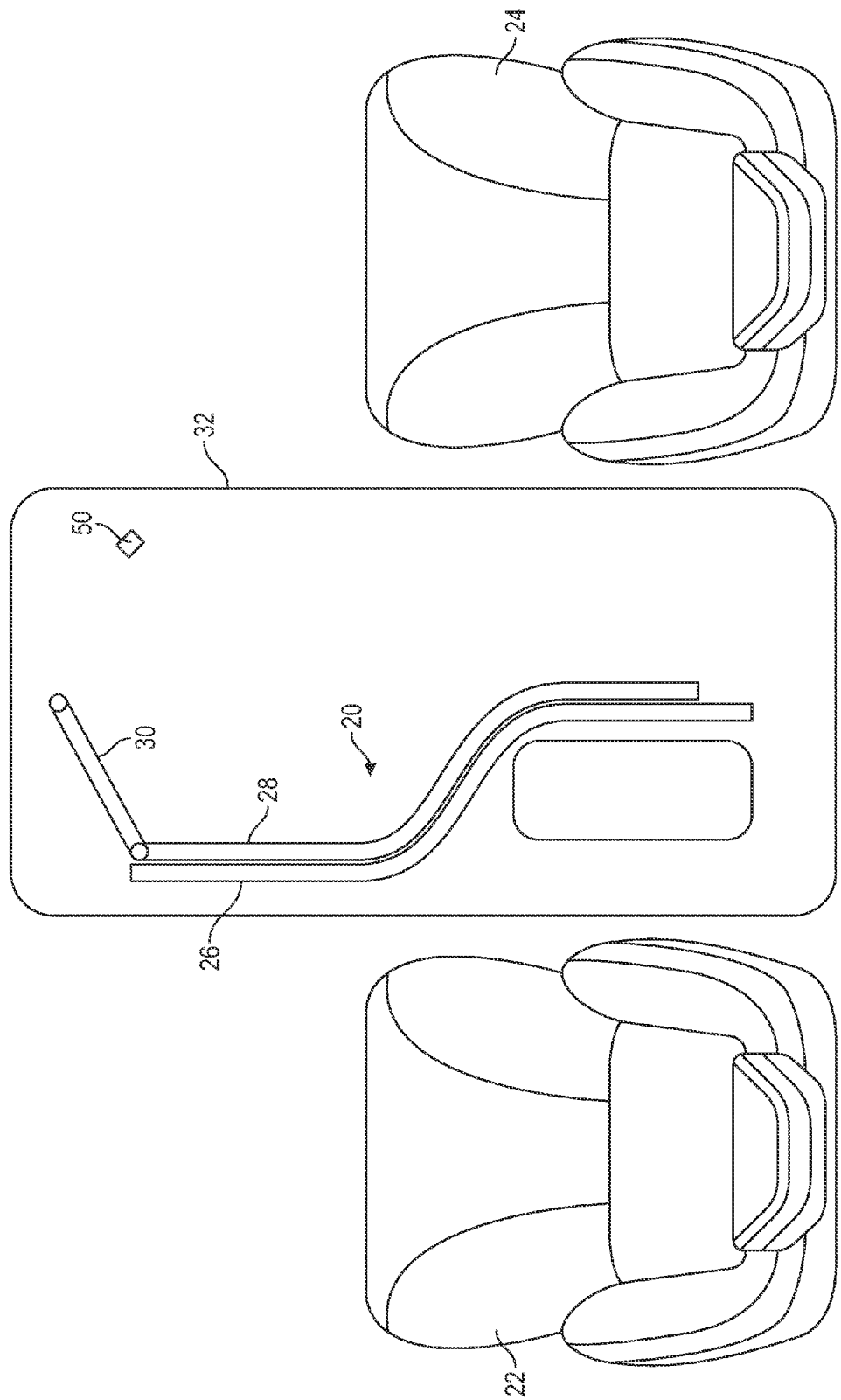
FIG. 4 is a plan view of a portion of the interior of the vehicle illustrating the reconfigurable console assembly with the reconfigurable wall in the stowed position.

FIG. 4 is a plan view of a portion of the interior of the vehicle illustrating reconfigurable console assembly 20 with reconfigurable wall 28 in the stowed position. The instrument panel depicted in previous views has been omitted for the ease of illustration. The perspective presented in FIG. 4 clearly shows the form fitting alignment between reconfigurable wall 28 and stationary wall 26. Additionally, the "S-shaped" curvature of stationary wall 26 is plainly visible. In order to move reconfigurable wall 28 from the stowed position to the deployed position, a vehicle occupant need only apply an appropriate amount of force to either toggle panel 30 or to reconfigurable wall 28. The force will need to be applied in a direction that is generally towards the front passenger side of the vehicle and will need to exceed a threshold level that is sufficient to overcome the bias caused by reconfigurable wall 28 acting toward stationary wall 26.

Figure 5:
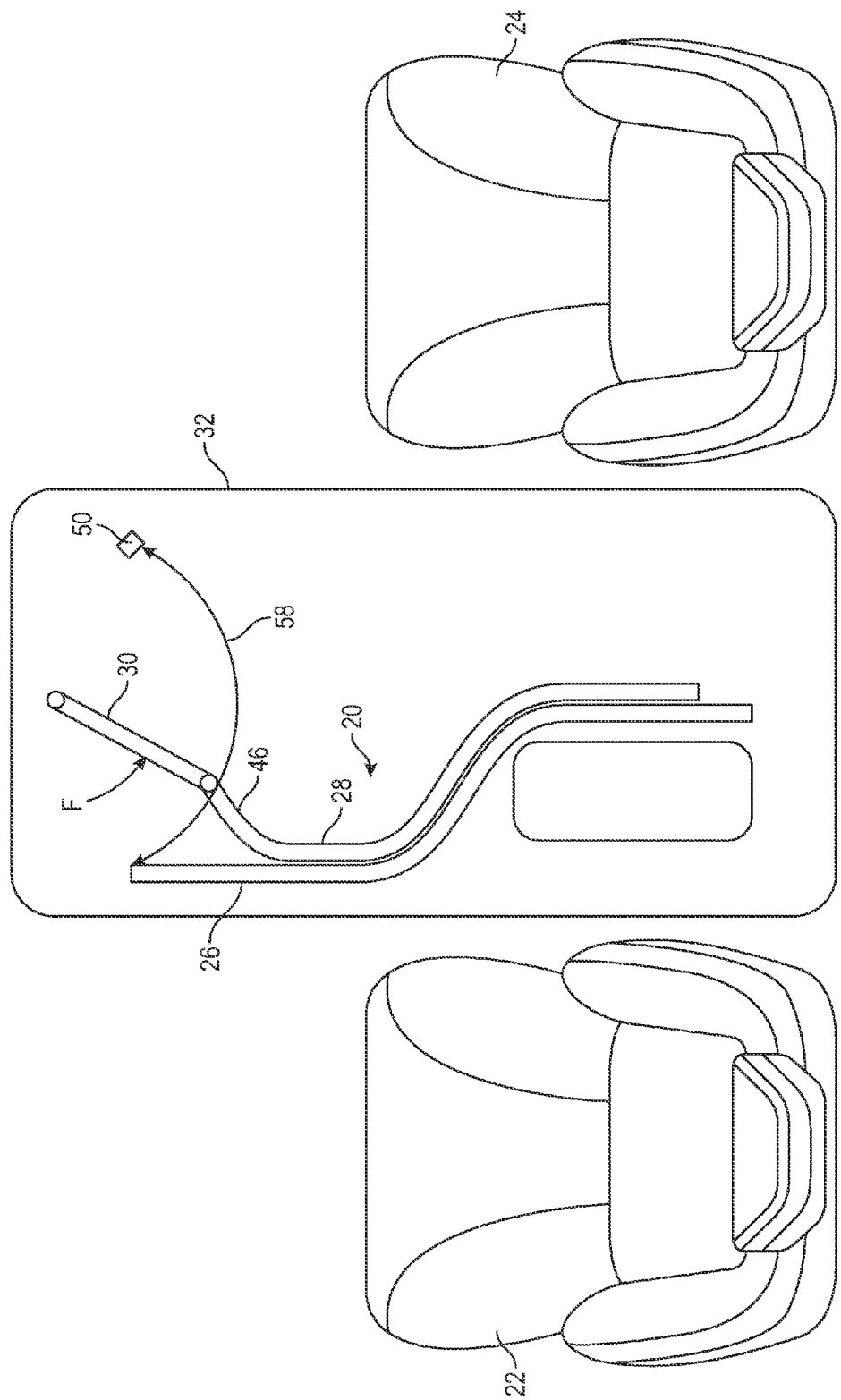
FIG. 5 is a view similar to FIG. 4, showing the reconfigurable wall as it begins to move towards the deployed position.

FIG. 5 illustrates reconfigurable wall 28 when a force F is applied to toggle panel 30 to move front portion 46 from the stowed position to the deployed position. It should be understood that force F may alternatively be applied directly to reconfigurable wall 28 with the same result of moving front portion 46 from the stowed position to the deployed position.

Force F is a force that is sufficient to overcome the biasing force of reconfigurable wall 28 urging toggle panel 30 towards driver seat 22. Force F causes toggle panel 30 to begin to move through an arc 58 from the retracted position towards the extended position. At the same time, toggle panel 30 will transmit Force F to front portion 46. The transmission of force F from toggle panel 30 to front portion 46 causes front portion 46 to begin moving towards the deployed position. This is possible because reconfigurable wall 28 is configured to flex along its longitudinal axis. Thus, force F causes reconfigurable wall 28 to curve towards the passenger side of the vehicle as toggle panel 30 begins to move through arc 58 towards blocking member 50. Front portion 46 will be constrained by its connection to toggle panel 30 to also travel through arc 58 as it moves between the stowed position and the deployed position.

Once front portion 46 has moved beyond a certain point (referred to as a dwell point), the bias caused by reconfigurable wall 28 will change directions and will begin to urge toggle panel 30 towards blocking member 50. Therefore, once front portion 46 has moved past the dwell point, the occupant will no longer need to apply force F to toggle panel 30.

Figure 6:
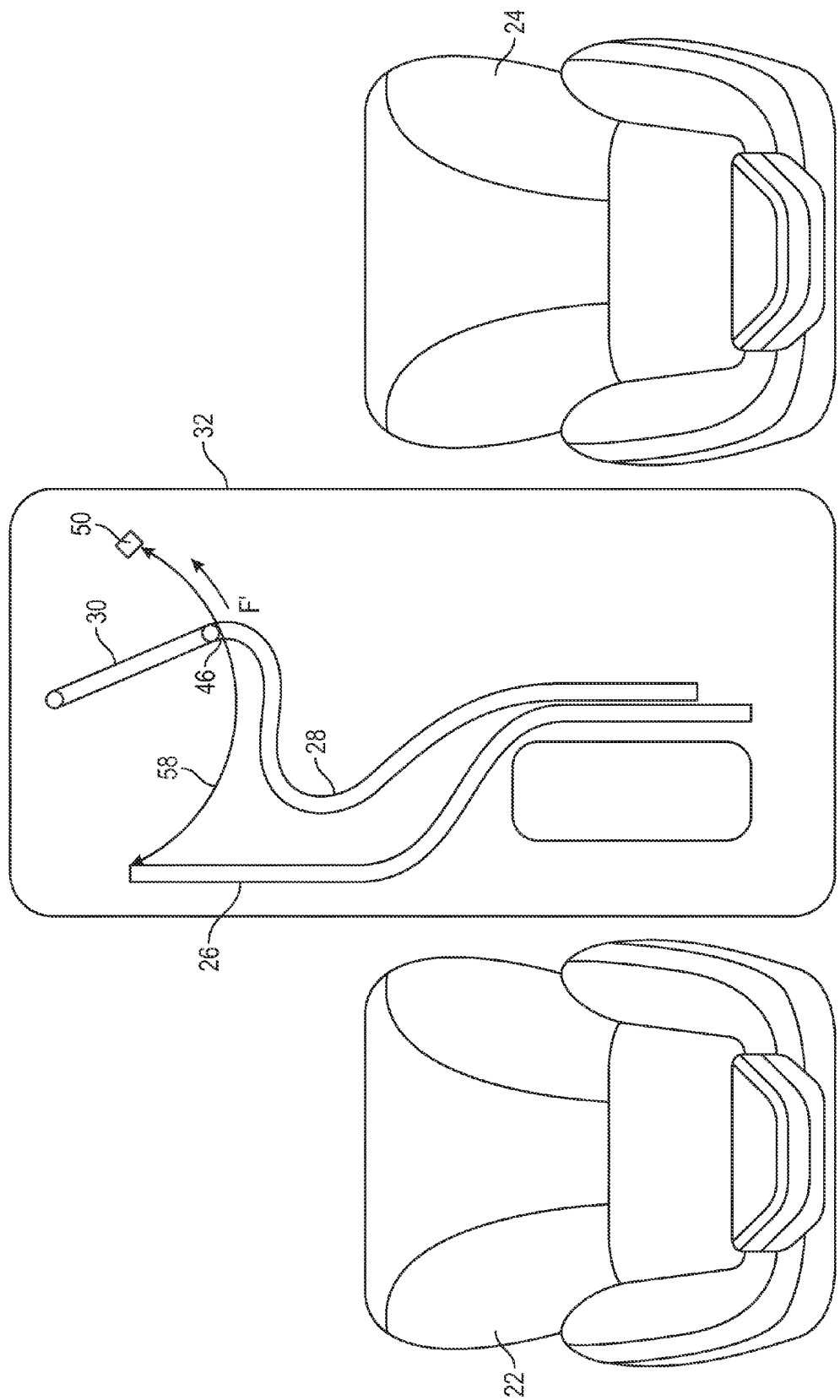
FIG. 6 is a view similar to FIG. 5, showing the reconfigurable wall continuing to move towards the deployed position and after it has passed a dwell point.

FIG. 6 illustrates the continuing movement of front portion 46 towards the deployed position. In the view presented in FIG. 6, front portion 46 has passed the dwell point. Accordingly, a biasing force F' will be exerted by reconfigurable wall 28 on toggle panel 30 in a direction towards the passenger side of the vehicle and will cause toggle panel 30 to continue pivoting through arc 58 towards blocking member 50. At this stage, the occupant can release toggle panel 30 or otherwise cease application of force F to toggle panel 30.

Figure 7:
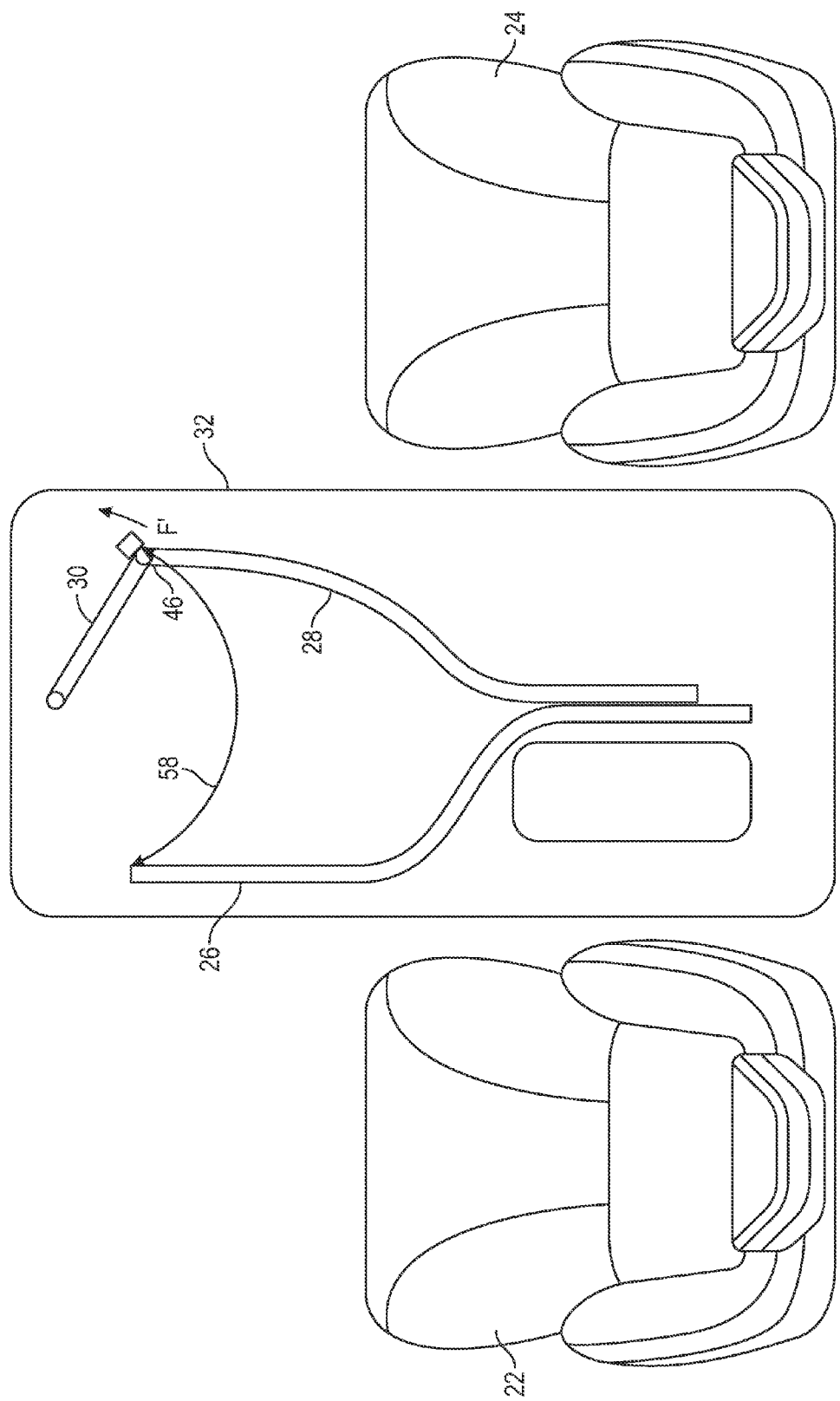
FIG. 7 is a view similar to FIG. 6, showing the reconfigurable wall in the deployed position.

FIG. 7 illustrates reconfigurable wall 28 in the deployed position. Toggle panel has come to rest against, and is obstructed from any further movement along arc 58 by blocking member 50. Furthermore, toggle panel 30 is urged to remain in that position by the biasing force F' exerted by reconfigurable wall 28.

Figure 8:
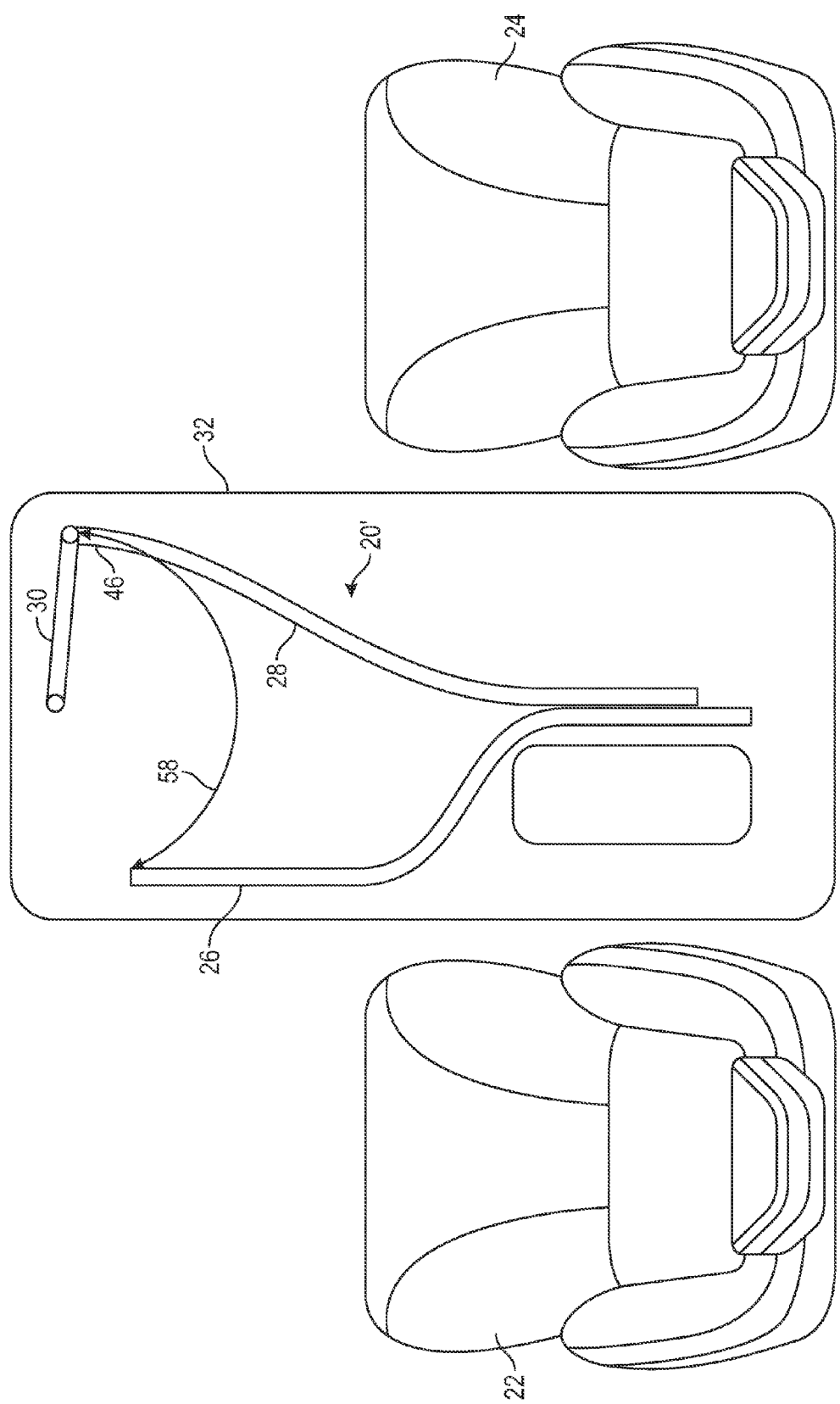
FIG. 8 is a view similar to FIG. 7, showing an alternate embodiment of the reconfigurable console assembly of FIG. 1 with the reconfigurable wall in the deployed position.

FIG. 8 illustrates an alternate embodiment 20' of the reconfigurable console assembly. With continuing reference to FIGS. 1-7, embodiment 20' of FIG. 8 omits blocking member 50. Accordingly, reconfigurable wall 28 is allowed to fully extend and drive toggle panel 30 further upwards along arc 58.

Figure 9:
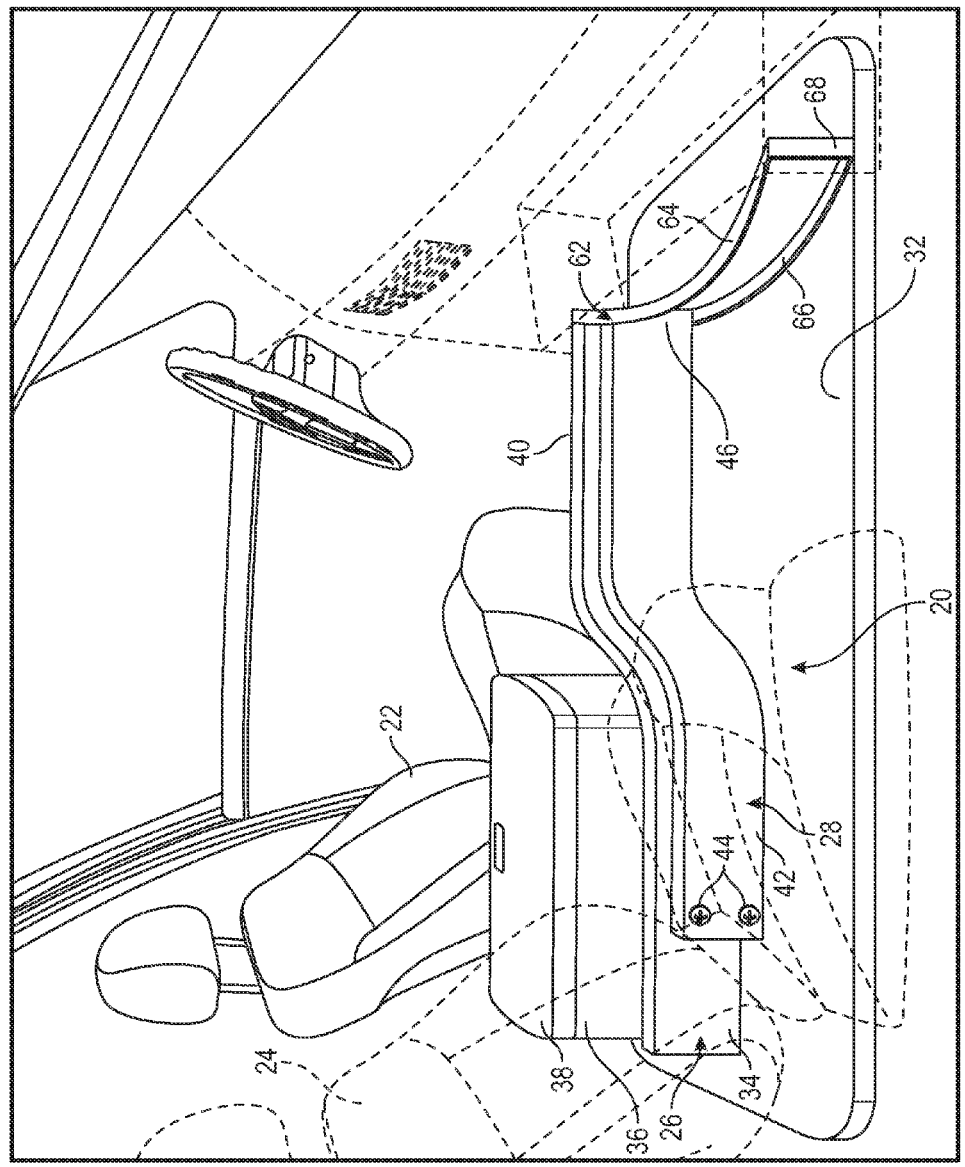
FIG. 9 is a perspective view similar to FIG. 1 illustrating an alternate embodiment of the reconfigurable console assembly of the present disclosure with a reconfigurable wall positioned in a stowed position.
Figure 10:
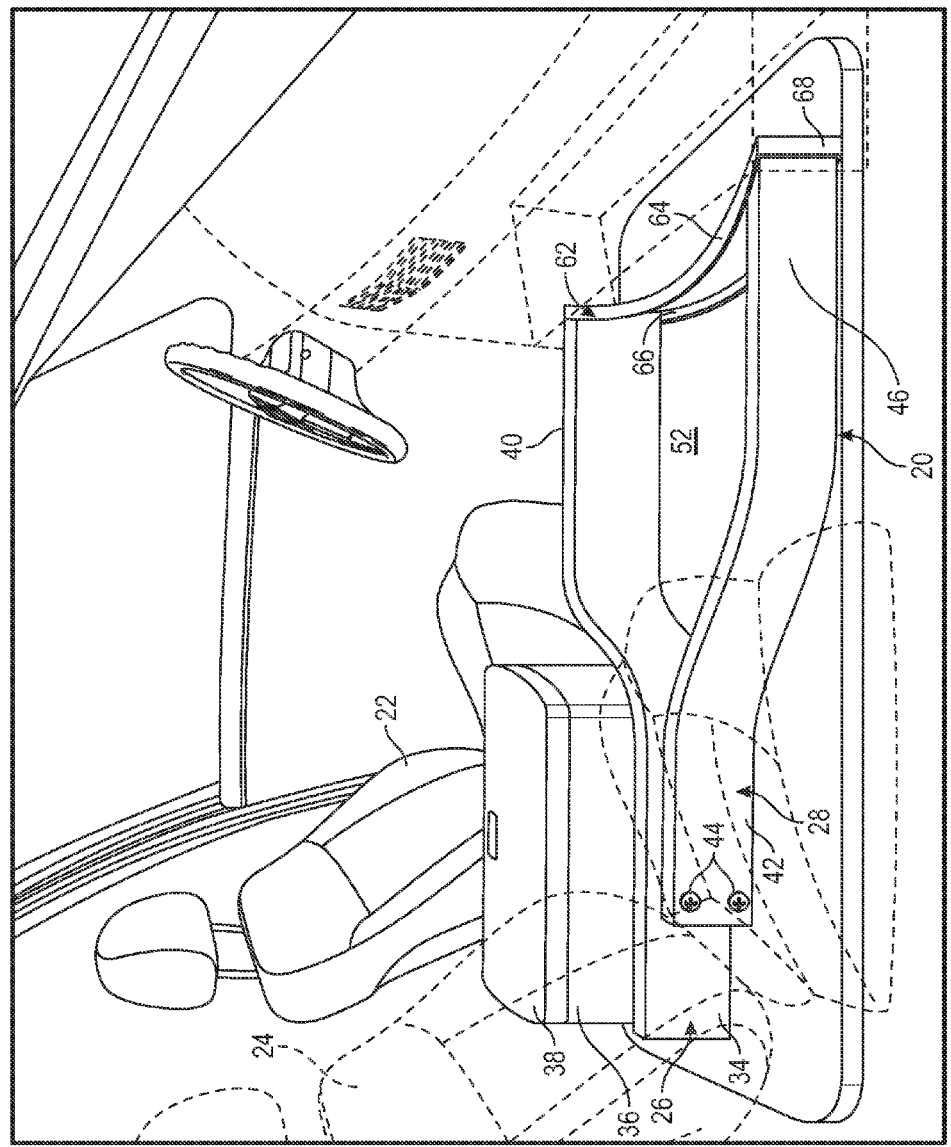
FIG. 10 is a perspective view similar to FIG. 9 illustrating the alternate embodiment of the reconfigurable console assembly with the reconfigurable wall positioned in the deployed position.

FIG. 9 is a perspective view similar to FIG. 1 illustrating an another alternate embodiment 60 of the reconfigurable console assembly of the present disclosure. With continuing reference to FIGS. 1-8, the primary difference between reconfigurable console assembly 20 and alternate embodiment 60 is that while reconfigurable console assembly 20 included toggle panel 30 as a constraining element to control the movement of front portion 46, alternate embodiment 60 includes a track assembly 62 to constrain the movement of front portion 46 and to control movement of front portion 46 from the stowed position (as illustrated in FIG. 9) to the deployed position (as illustrated in FIG. 10). Track assembly 62 has an upper track 64 and a lower track 66 joined together at one end by front portion 40 of stationary wall 26 and joined together at the other end by a vertical post 68. A pin (not shown) may be attached to front portion 46 and may be configured to engage upper track 64 and lower track 66. Engagement between the pin and track assembly 62 will guide the movement of front portion 46 along the arcuate path formed by upper track 64 and lower track 66 when front portion 46 moves from the stowed position to the deployed position. In some variations of this embodiment, the arcuate path defined by track assembly 62 may a true arc, similar to the arc defined by toggle panel 30 as it moves between the stowed and the deployed positions. In other variations, the arcuate path defined by track 62 need not be a true arc. Rather, the shape of the arcuate path may be tuned and refined to facilitate movement of front portion 46 between the stowed and the deployed positions.

FIG. 10 is a perspective view similar to FIG. 9 illustrating alternate embodiment 60 with reconfigurable wall 28 positioned in the deployed position. As illustrated, reconfigurable wall 28 and stationary wall 26 cooperate to form bin 52.

Figure 11:
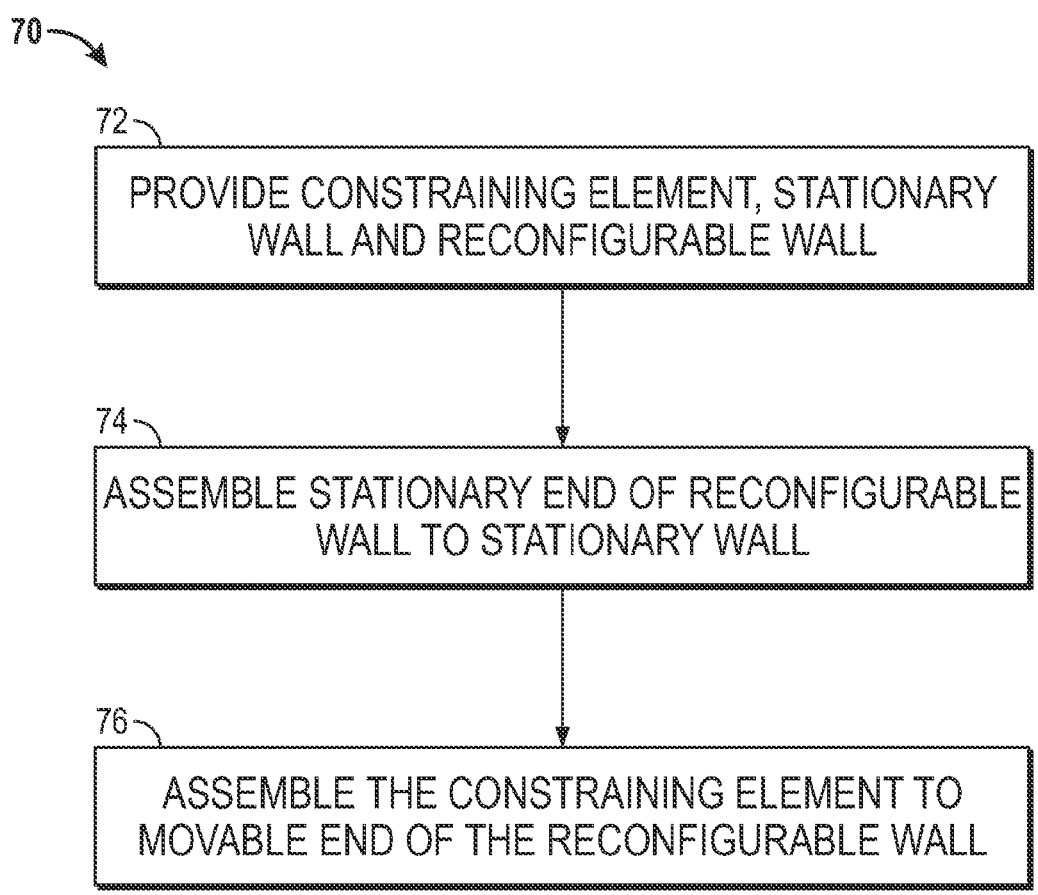
FIG. 11 is a block diagram illustrating a non-limiting embodiment of a method for assembling a reconfigurable console assembly.

FIG. 11 is a block diagram illustrating a non-limiting embodiment of a method 70 for assembling a reconfigurable console assembly. At block 72, the elements of the reconfigurable console assembly will be provided. With continuing reference to FIGS. 1-10, a constraining element would be provided. Such a constraining element may comprise a toggle panel such as toggle pane 30 or a track assembly such as track assembly 62, or any other mechanism effective to control the movement of a front end of a reconfigurable wall as it moves from the stowed position to the deployed position. A stationary wall, such as, but not limited to, stationary wall 26 would also be provided. A reconfigurable wall, such as, but not limited to, reconfigurable wall 28 would also be provided.

At block 74, a stationary end of the reconfigurable wall is attached to the stationary wall. This may be accomplished via the use any suitable method effective to inhibit movement between the stationary wall and the stationary end of the reconfigurable wall.

At block 76, the constraining element is assembled to the movable end of the reconfigurable wall. With the reconfigurable console assembly thus assembled, it is now ready for installation into a vehicle. In other embodiments, the stationary wall may initially be attached to a base or to a surface of a vehicle such as, but not limited to, a floor surface of a vehicle before the steps illustrated at blocks 72, 74, and 76 are executed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof

What is claimed is:

1. A reconfigurable console assembly for a vehicle, the reconfigurable console assembly comprising:
    a stationary wall adapted for attachment to the vehicle;
    a reconfigurable wall having a stationary end, a movable end, and a substantially constant length, the stationary end attached to the stationary wall, the movable end being configured to move between a stowed position and a deployed position, the reconfigurable wall being configured to flex along a longitudinal axis as the movable end moves between the stowed position and the deployed position, and the stationary wall and the reconfigurable wall defining a storage bin when the movable end is in the deployed position;
    a constraining element connected to the movable end, the constraining element configured to constrain the movable end to remain in the stowed position when the movable end is in the stowed position and to constrain the movable end to remain in the deployed position when the movable end is in the deployed position;
    wherein the movable end is disposed proximate the stationary wall when the movable end is in the stowed position and wherein the movable end is spaced apart from the stationary wall when the movable end is in the deployed position.

2. The reconfigurable console assembly of claim 1, wherein the movable end is disposed adjacent the stationary wall when the movable end is in the stowed position.

3. The reconfigurable console assembly of claim 1, wherein the reconfigurable wall is substantially form fitting to the stationary wall when the movable end is in the stowed position.

4. The reconfigurable console assembly of claim 3, wherein the stationary wall has an arcuate curvature.

5. The reconfigurable console assembly of claim 4, wherein the stationary wall has a generally "S-shaped" configuration.

6. The reconfigurable console assembly of claim 1, wherein the reconfigurable wall comprises a blade spring.

7. The reconfigurable console assembly of claim 1, further comprising a base connected to the stationary wall, the base configured to support the stationary wall on an interior surface of the vehicle.

8. The reconfigurable console assembly of claim 7, wherein the constraining element is mounted to the base.

9. The reconfigurable console assembly of claim 1, wherein the constraining element comprises a toggle panel having a proximal end and a distal end, the proximal end being connected to the movable end of the reconfigurable wall and the distal end being configured to pivot such that the toggle panel is enabled to pivot between a retracted position and an extended position as the movable end of the reconfigurable wall moves between the stowed position and the deployed position.

10. The reconfigurable console assembly of claim 9, wherein the proximal end of the toggle panel is connected to the movable end of the reconfigurable wall via a hinge.

11. The reconfigurable console assembly of claim 1, wherein the constraining element comprises a track portion, wherein the movable end of the reconfigurable wall is configured to slide in the track portion between a retracted position and an extended position.

12. The reconfigurable console assembly of claim 11 wherein the track portion comprises an upper track segment and a lower track segment and wherein an upper end of the movable end engages the upper track segment and wherein a lower end of the movable end engages the lower track segment.

13. A method of manufacturing a reconfigurable console assembly, the method comprising the steps of:
    providing a constraining element, a stationary wall, and a reconfigurable wall having a stationary end and a movable end, the reconfigurable wall being configured to flex along a longitudinal axis;
    assembling the stationary end of the reconfigurable wall to the stationary wall such that the movable end of the reconfigurable wall is enabled to move between a stowed position proximate the stationary wall and a deployed position spaced apart from the stationary wall; and
    assembling the constraining element to the movable end of the reconfigurable wall such that the constraining element constrains the movable end to remain in the stowed position when the movable end is in the stowed position and constrains the movable end to remain in the deployed position when the movable end is in the deployed position.

* * * * *